(12) United States Patent
Hart et al.

(10) Patent No.: US 6,314,269 B1
(45) Date of Patent: Nov. 6, 2001

(54) MULTI-BEAM TDMA SATELLITE MOBILE COMMUNICATIONS SYSTEM

(75) Inventors: Nicholas Hart, Wahroonga (AU); Gunnar Bjornstrom, Slough (GB)

(73) Assignee: International Mobile Satelitte Organization (GB)

( * ) Notice: Subject to any disclaimer, the term of this patent is extended or adjusted under 35 U.S.C. 154(b) by 0 days.

(21) Appl. No.: 08/750,915

(22) PCT Filed: May 16, 1995

(86) PCT No.: PCT/GB95/01103

§ 371 Date: Aug. 11, 1997

§ 102(e) Date: Aug. 11, 1997

(87) PCT Pub. No.: WO96/03814

PCT Pub. Date: Feb. 8, 1996

(30) Foreign Application Priority Data

Jul. 22, 1994 (GB) .................................................. 9414829

(51) Int. Cl.[7] .................................................. H04B 7/185
(52) U.S. Cl. .................................................. 455/12.1; 455/429
(58) Field of Search .................................................. 455/12.1, 13.1, 455/13.2, 427, 69, 428, 429, 430

(56) References Cited

U.S. PATENT DOCUMENTS

| | | |
|---|---|---|
| 3,262,116 | 7/1966 | Hutchinson et al. . |
| 3,651,406 | 3/1972 | Mohr et al. . |
| 3,858,007 | 12/1974 | Licentia . |
| 3,896,382 | 7/1975 | Magenheim . |
| 4,041,397 | 8/1977 | Bauer et al. . |
| 4,105,973 | 8/1978 | Arnold et al. . |
| 4,189,675 | 2/1980 | Frosch . |
| 4,218,654 | 8/1980 | Ogawa et al. . |
| 4,715,048 | 12/1987 | Masamura . |
| 4,744,083 | 5/1988 | O'Neill et al. . |
| 4,975,707 | 12/1990 | Smith . |
| 5,008,679 | 4/1991 | Efflond et al. . |
| 5,233,626 | 8/1993 | Ames . |
| 5,261,118 * | 11/1993 | Vanderspool, II et al. ......... 455/12.1 |
| 5,268,694 | 12/1993 | Jan et al. . |
| 5,287,541 * | 2/1994 | Davis et al. ........................ 455/12.1 |
| 5,408,237 | 4/1995 | Patterson et al. . |

FOREIGN PATENT DOCUMENTS

| | | |
|---|---|---|
| 0 167 458 | 1/1986 | (EP) . |
| 0 464 765 A1 | 1/1992 | (EP) . |
| 0 536 068 B1 | 4/1993 | (EP) . |
| 0 337 267 B1 | 12/1993 | (EP) . |
| 0 575 678 A1 | 12/1993 | (EP) . |
| 0 578 075 A2 | 1/1994 | (EP) . |
| 0 578 075 A3 | 1/1994 | (EP) . |
| 0 365 885 B1 | 9/1995 | (EP) . |
| WO 87/02191 | 4/1987 | (WO) . |
| WO 88/01456 | 2/1988 | (WO) . |
| WO 88/04495 | 6/1988 | (WO) . |

OTHER PUBLICATIONS

European Search Report.
Haruo Kondo et al., "Frequency Shared Access Control for Multi–Beam Mobile Satellite Communications Systems", pp. 755–759, SUPERCOMM/ICC 1992, vol. 2, No. 328, Jun. 1992.
Robert A. Wiedeman et al., "The Globalstar Mobile Satellite System For Worldwide Personal Communications", pp. 291–296, NASA Reference Publication 1274, 1992.
G. Maral et al., Satellite Communications Systems, John Wiley & Son, pp. 183–186, XP002123253 Chichester, 1993.
Tatsuo Watanabe et al., "Space Diversity System For TDMA Satellite Links", pp. 319–326, published 1979.

* cited by examiner

*Primary Examiner*—Reinhard Eisenzopf
*Assistant Examiner*—Sam Bhattacharya
(74) *Attorney, Agent, or Firm*—Banner & Witcoff, Ltd.

(57) ABSTRACT

An earth station receives a return signal via more than one satellite link from a mobile terminal using TDMA. The earth station selects one or more of the satellite links for transmitting a forward signal on the basis of the quality of signal received via each link. The earth section allocates frequency channels to the mobile terminals according to their location on the surface of the earth, so that the propagation time to and from those mobile terminals which share the same frequency channel is approximately the same. The satellite includes an antenna which generates an array of beams which are individually pointed to fixed regions of the earth, until the elevation of the satellite relative to a fixed region falls below a minimum value, in which case the corresponding beam is redirected to a new area, while the other beams remain pointed at the corresponding fixed areas. In this way, beam-to-beam handover is reduced, while maintaining the boresight of the antenna pointing at the nadir.

28 Claims, 9 Drawing Sheets

MULTI-BEAM TDMA SATELLITE MOBILE COMMUNICATIONS SYSTEM

TECHNICAL FIELD

The present invention relates to a method and apparatus for communication via satellite, and in particular but not exclusively for voice or data communication using non-geostationary satellites and/or mobile terminals.

BACKGROUND ART

In communication systems which use non-geostationary satellites, the number and orientation of satellites in view of a ground-based terminal varies during a call. Thus, the communication link between the terminal and any one satellite may become weaker as the elevation angle of the satellite decreases and ultimately the link may become inoperable as the satellite moves out of sight of the terminal. It is therefore desirable to select another satellite for communication with the terminal, in a procedure known as "handover". The document U.S. Pat. No. 3,349,398 describes one such method. However, handover between satellites may result in loss of part of the signal, or sudden variations in signal quality, which are unacceptable in voice or data communications.

Furthermore, the line of sight between the terminal and a particular satellite may become obstructed by buildings, trees or other obstacles as the terminal or the satellite moves during a call. This effect is known as "blockage", and leads to fading in the received signal.

Signal fading may also occur when a signal transmitted by a satellite is reflected off the ground or buildings and the reflected signal is received at the terminal together with the direct signal. The phase difference between the direct and reflected signals may lead to destructive interference at the terminal, so that the received signal strength is reduced. This is known as "multipath" fading.

The document WO-A-93 09578 discloses a satellite communication system in which the satellites monitor the quality of signal received from a terminal and determine which one is best suited to handle the call to the terminal. One of the satellites re-transmits the signal received from the terminal to other satellites or gateways.

The conference paper "The Globalstar Mobile Satellite System for Worldwide Personal Communications" by Wiedeman and Viterbi, $3^{rd}$ International Mobile Satellite Conference, Jun. 16–18 1993, Pasadena, Calif. discloses a communication system in which return link signals are received by two or three satellites; gateway stations measure the signal level of each of these alternate paths and control which signal paths are used. This system is exclusively designed for use with code-divided multiple access (CDMA).

However, CDMA suffers from a number of drawbacks when used for mobile communications. The mobile terminals are complex, since they require a separate decoder for each satellite path. Moreover, CDMA is inefficient in frequency re-use unless the users are evenly distributed, and power levels cannot be freely varied for each user without causing interference for other users. Furthermore significant interference takes place at peak levels of use.

STATEMENT OF THE INVENTION

According to one aspect of the present invention, there is provided a method of communication between a terrestrial station and a plurality of terminals using TDMA to address each of the terminals from the terrestrial station, in which diversity is provided in the link between the terrestrial station and each terminal, by sending the same information through two or more satellites.

The information may be sent in the same TDMA time slot through the two or more satellites, or may be sent in different time slots.

In this way, blockage may be reduced without the inherent disadvantages of CDMA.

The terrestrial station may either decode the best received signal from each terminal or may combine all of the received signals to reduce error in the received signal. The terrestrial station may then select a forward link to each terminal through one or more of the satellites according to the quality of signal received from the terminal through the satellites.

Thus, a smooth handover may be achieved and blockage and fading may be reduced.

In order that the selection of satellite for the forward link may be transparent to the terminal, the terrestrial station may calculate the delay in the transmission via the selected satellite and adjust the timing of its transmission accordingly so that the transmitted signal is received by the terminal in the same time slot throughout the call. The calculation may take into account both the variation in delay as the selected satellite moves relative to the earth, and the difference in delay when handing over from one satellite to another, so that the quality of communication is not impaired by handover and complex circuitry is not required in the terminal.

In addition, the terrestrial station may compensate for the Doppler shift in the signal received from the terminal and adjust the frequency of the transmitted signal accordingly so that the terminal receives a signal at a constant frequency throughout a call. The Doppler shift may be partially compensated for by the satellites.

According to another aspect of the present invention, in order to facilitate simultaneous communication with multiple users through one satellite, areas of the earth are divided into a number of fixed regions, with a frequency being assigned to a terminal both for transmission and reception of signals according to the region in which the terminal is located. The locations of the regions are determined according to their positions on the earth, rather than their positions relative to the satellite. Simultaneous communication between different terminals in the same region and at the same frequencies may be achieved by allocating different time slots within a repeating time frame to each of the terminals. Since the different terminals using the same frequencies are contained within a fixed region and the variation in propagation delays is therefore limited, interference between the adjacent time slots is avoided.

According to another aspect of the present invention, there is provided a method of controlling a non-geostationary satellite which generates a plurality of individually steerable beams to provide communications links, in which each beam is directed towards a fixed region of the earth's surface until the beam is no longer suitable for communication with that fixed region as a result of the progress of the satellite relative to the earth's surface. The beam is then redirected to a new fixed region with which satisfactory communication is possible. Calls to the previous fixed region may be routed through another satellite.

In this way, the frequency of beam-to-beam handover may be reduced, without affecting the frequency of satellite-to-satellite handover.

The present invention extends to a terrestrial station having means for performing the functions of one or more of the earth stations or terminals described above.

BRIEF DESCRIPTION OF THE DRAWINGS

Specific embodiments of the present invention will now be described with reference to the accompanying drawings, in which.

MODES FOR CARRYING OUT THE INVENTION

First Embodiment

A first embodiment of the present invention will now be described with reference to FIGS. 1 to 8.

Figure 1:
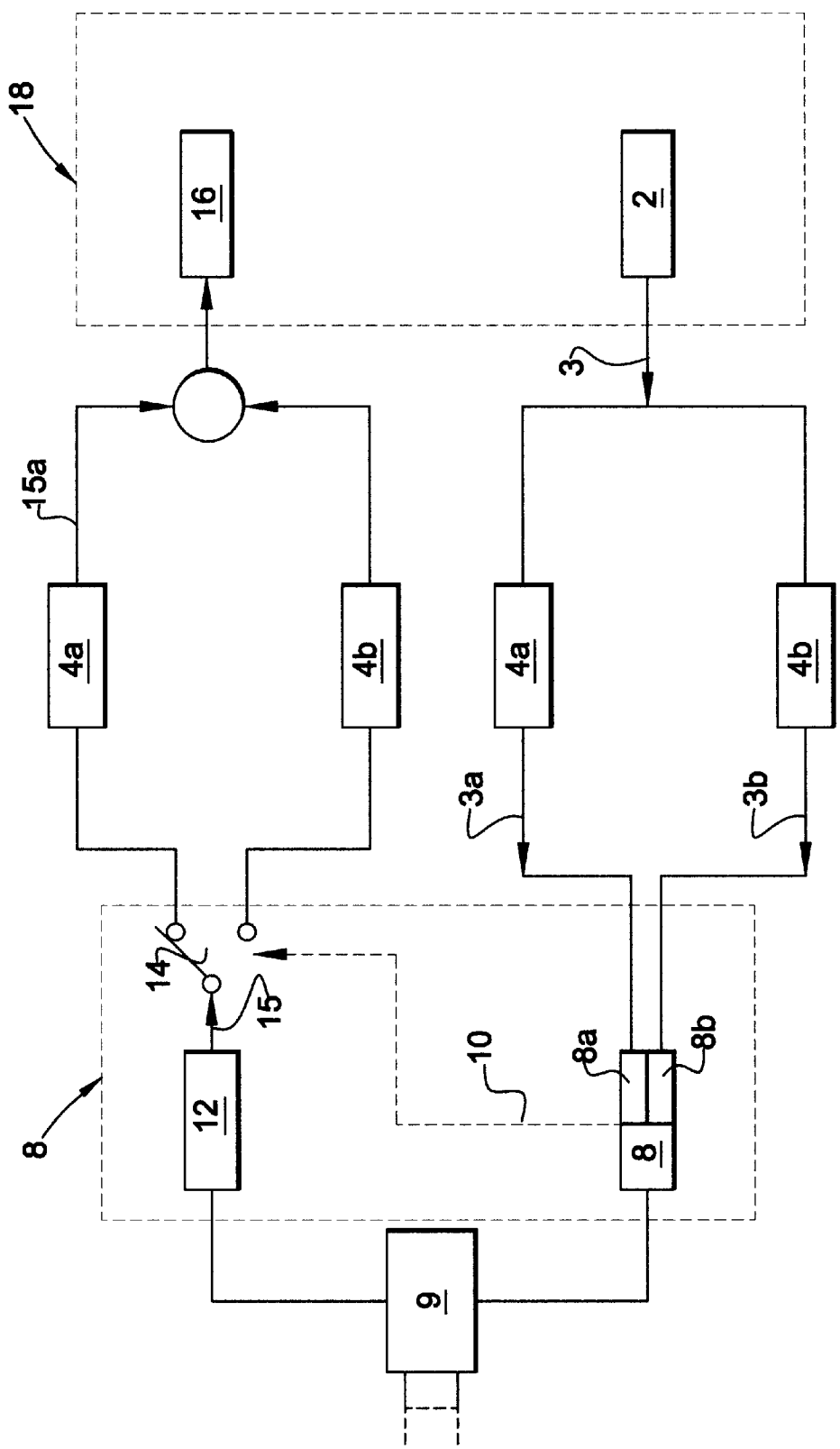
FIG. 1 is a schematic block diagram of the forward and return links between an earth station and a mobile terminal.

In FIG. 1, a transmitter 2 of a mobile terminal transmits a signal 3. The mobile terminal has a substantially omni-directional antenna, so that the transmitted signal 3 is received by a first satellite 4a and a second satellite 4b in view of the mobile terminal. The signal 3 is retransmitted from each satellite 4a, 4b as separate signals 3a and 3b. These signals 3a and 3b are received by an earth station 8 having first and second receivers 8a and 8b for receiving signals from the first and second satellites 4a and 4b respectively. In this embodiment, the earth station 8 has first and second directional antennas directed towards the first and second satellites 4a, 4b respectively. Thus, the same information is received twice by the earth station 8 in the separate signals 3a and 3b. The earth station 8 may therefore select the better of the two signals 3a and 3b, e.g. the one with the lowest error rate, for conversion to an analog signal for transmission over a public service telephone network (PSTN) 9. Alternatively, if both signals contain errors, data may be derived from both signals to provide a combined signal with fewer or no errors. The combined signal is then analog converted and sent to the PSTN 9.

The earth station 8 also analyses the received signals 3a and 3b to determine which is of better quality. Since there is a strong correlation between the strength of a return link from one of the satellites 4a, 4b and the strength of a forward link to the portable transmitter 2 through the same satellite 6a, 6b, the earth station 8 selects one of the satellites 6a, 6b for the forward link to the portable transmitter 2 and generates a selection signal 10.

When a signal is received from the PSTN 9 for transmission to the portable terminal 2, the signal is passed to a transmitter 12 in the earth station. The transmitter 12 selects one of the satellites 4a, 4b, as shown schematically in FIG. 1 by a switch 14, in response to the selection signal 10. In this case, the first satellite 4a is selected as the most suitable for the forward link. The transmitter 12 then transmits a signal 15 to the first satellite 4a, which retransmits the signal as a signal 15a to a receiver 16 of the mobile terminal. The transmitter 2 and the receiver 16 may be connected to the same antenna on the mobile terminal, or to separate antennas. In both cases, the receiving antenna is omni-directional and therefore may receive signals from either of the satellites 4a, 4b. Thus, the receiver 16 receives a signal 15 through the stronger link.

Figure 2:
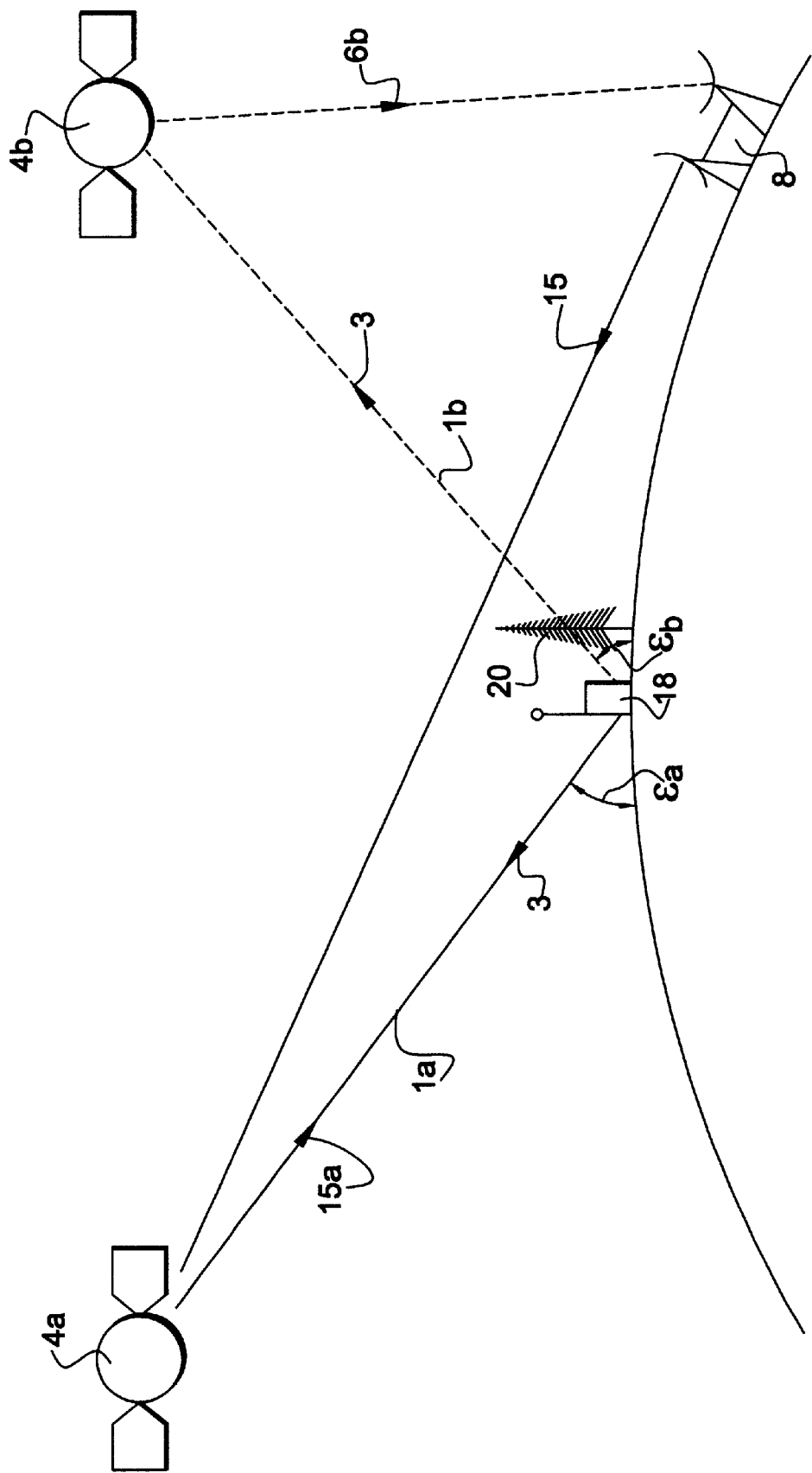
FIG. 2 is a schematic elevation showing alternative paths between the earth station and the mobile terminal.

A situation in which blockage occurs will now be described with reference to FIG. 2. This figure shows a section of the earth's surface on which the earth station 8 and a mobile terminal 18 are located. The first and second satellites 4a, 4b are within the line of sight of both the earth station 8 and the mobile terminal 18. The angle of elevation $\epsilon_b$ of the second satellite 4b relative to the mobile terminal 18 is greater than the angle of elevation $\epsilon_a$ of the first satellite 4a and the path distances between the earth station 8 and the second satellite 4b, and between the second satellite 4b and the mobile terminal 18 are shorter than those between the first satellite 4a and the mobile terminal 18 and earth station 8.

However, in this case the mobile terminal 18 is positioned close to a tall obstacle 20 such as a tree, which obscures the line of sight 1b between the mobile terminal 18 and the second satellite 4b. Thus, when the mobile terminal 18 transmits a signal 3, this signal 3 is only weakly received by the second satellite 4b and thus the retransmitted signal 6b is more likely to contain errors. The earth station selects the first satellite 4a as providing a better forward link and transmits the response signal 15 only to the first satellite 4a. This response signal is retransmitted as signal 15a to the mobile terminal 18. Since the line of sight 1a between the first satellite 4a and the mobile terminal 18 is not obscured, the response signal is received strongly by the mobile terminal 18. The mobile terminal 18 does not need to select from which satellite 4a, 4b it is to receive the response signal 15a, since this is decided at the earth station 8. Selection of the satellites 4a, 4b is therefore transparent to the mobile terminal.

If, on the other hand, the mobile terminal 18 were to move such that the obstacle 20 no longer obstructs the line of sight 1b, then the earth station 8 may receive a better signal from the second satellite 4b and will therefore select the second satellite 4b for the forward link.

When different frequencies are used for the forward and return links, and the fading is due to multipath interference, there may not be a strong correlation between the quality of forward and return links. In this case, the mobile terminal 18 transmits information to the earth station 8 relating to the strength of the signal received by the terminal 18 from the earth station 8. If the earth station 8 receives a good return link signal from the first satellite 4a but information transmitted by the mobile terminal 18 indicates that fading is occurring on the forward link, the earth station 8 may then select the satellite from which the next best signal is received for the forward link. In a case where each satellite generates several overlapping beams for communication with mobile terminals at different frequencies, the earth station 8 selects instead a different beam generated by the first satellite.

Figure 3:
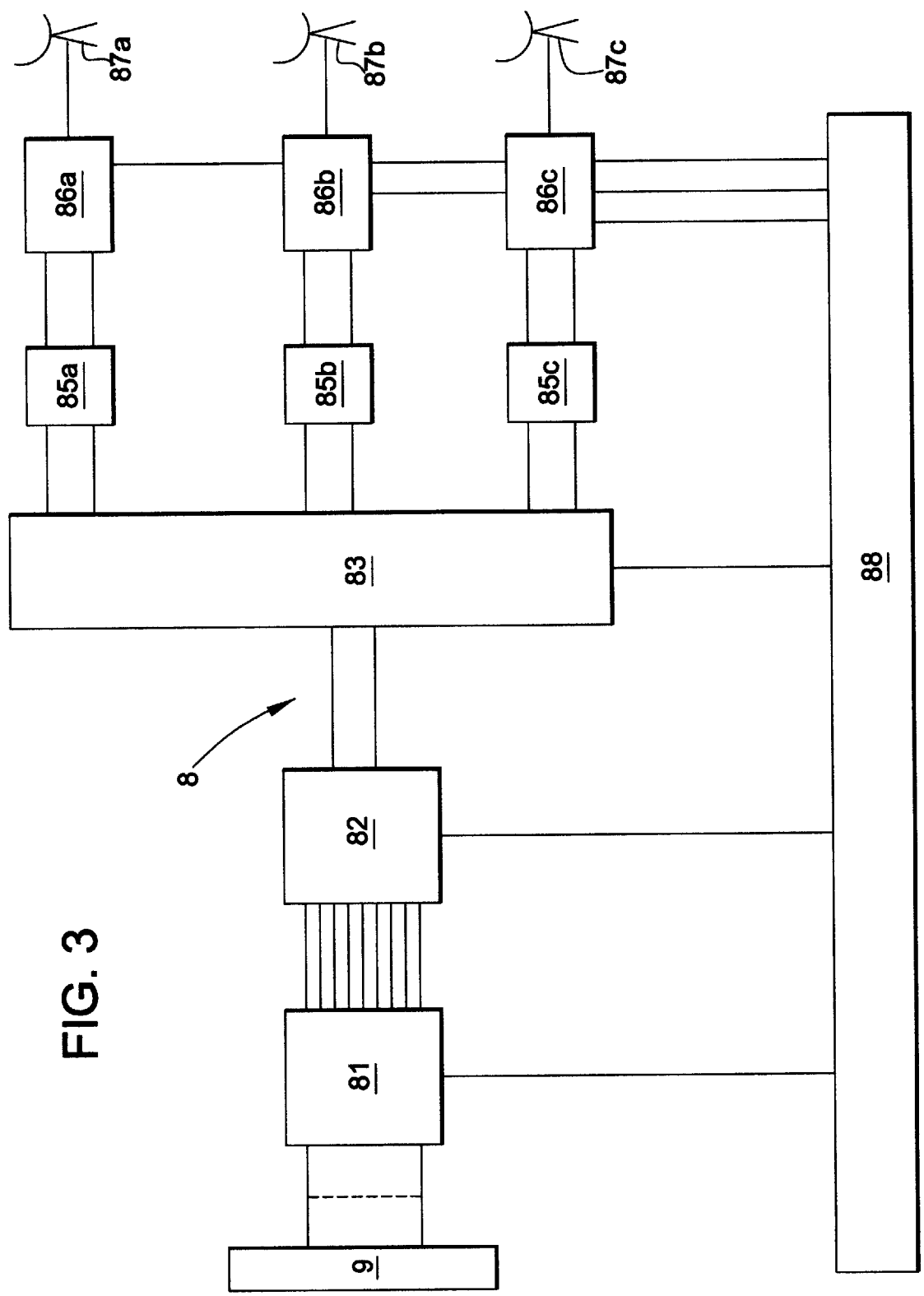
FIG. 3 is a schematic diagram of the earth station.

The operation of the mobile terminal 18 and the earth station 8 will now be explained with reference to FIGS. 3, 4, and 5.

Earth Station

In this example, analog speech signals are received at the earth station 8 from the PSTN 9 for transmission to the mobile terminals 18. As shown in FIG. 3, the analogue speech signals are digitized and encoded by a codec 81 and the encoded speech is converted into a series of discrete packets at a multiplexer/demultiplexer 82.

The transmission of the packets is controlled by a controller 88 which selects which satellite 4 is to be used for the forward link on the basis of the quality of signal received from each satellite 4. The controller 88 controls a selector 83 to send each packet to one of a plurality of buffers 85a, 85b, 85c. The timing of the output of each buffer 85 is controlled by the controller 88. The packets output from the buffer 85a, 85b, 85c are radio frequency modulated by corresponding RF modulators/demodulators 86a, 86b, 86c, the frequency of modulation being controlled by the controller 88. The RF signals are modulated in different frequency bands selected by the controller 88 according to a selected beam of the satellite 4 in which the signals are to be retransmitted to the mobile terminal 18. The RF signals are transmitted by directional antennas 87a, 87b, 87c which are each steered towards a corresponding satellite 4a, 4b, 4c.

Each directional antenna 87 also receives signals transmitted from mobile terminals on the return link from the corresponding satellite 4, which are radio frequency demodulated by the RF modulators/demodulators 86 to form received packets. The received packets are buffered by the buffers 85 and selected by the selector 83. The series of packets is separated in channels by the multiplexer/demultiplexer 82 and decoded by the codec 81 which may also perform error checking by comparing packets received from the same mobile terminal 18 via different satellites 4. The resultant analog signals are sent to the PSTN 9 on different lines.

The earth station 8 need not be connected directly to the PSTN 9. Instead, earth stations are preferably connected to PSTNs and other fixed and mobile networks through a ground network, as described in patent publications nos. GB-A-2293725 and WO96/03814 both incorporated herein by reference.

Mobile Terminal

Figure 4:
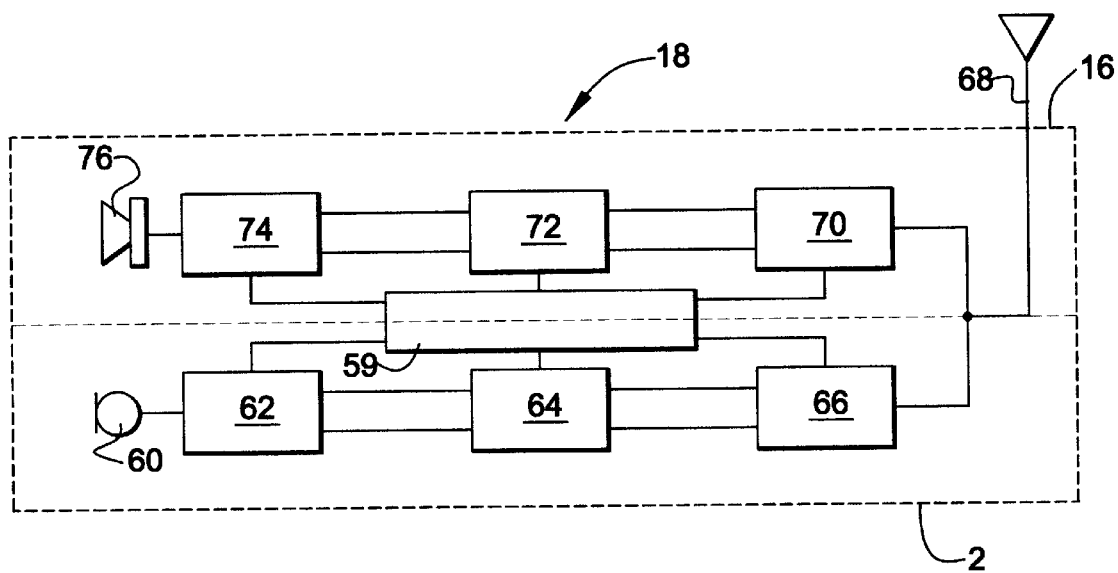
FIG. 4 is a schematic diagram of the mobile terminal.

As shown in FIG. 4, each mobile terminal 18 includes a microphone 60 in which speech is converted into analog signals. The analog signals are converted to digital signals by an A/D converter 62 and the digital signals are encoded to form the packets by a coder 64. The coded packets are RF modulated by an RF modulator 66 for transmission from an omnidirectional aerial 68.

Signals received through the aerial 68 are RF demodulated by a demodulator 70 as received packets. The received packets are then decoded by a packet decoder 72 to form digital speech signals which are converted to analog speech signals by a D/A converter 74. The analog signals are output to a loudspeaker 76 to produce audible speech. The operation of the mobile terminal 18 is controlled by a control unit 59, such as a microprocessor and/or DSP device, which is connected to additional conventional handset components such as a key pad (not shown).

Satellite

Figure 5:
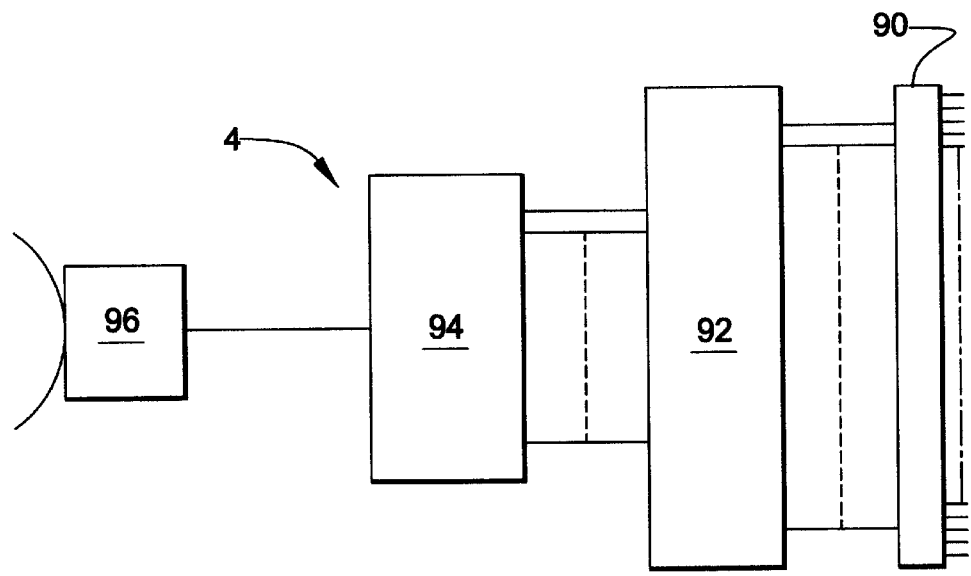
FIG. 5 is a schematic diagram of one of the satellites.

Referring to FIG. 5, each satellite 4 includes an antenna 90 and a beam-forming device 92, which may be a radiating array antenna and a large Butler matrix as described in Patent publication No. GB-A-2288913 (incorporated herein by reference). The beam-forming device 92 converts signals from each element of the array into signals from a plurality of beams and vice versa. Signals received by the antenna 90 from the mobile terminals 18 are fed via a control unit 94 to an antenna 96 which retransmits the signals towards the earth station in a frequency band corresponding to the beam in which the signals were received. The is antenna 96 may be steered towards the earth station 8. Likewise, signals received from the antenna 96 from the earth station 8 are redirected to one of the beams of the antenna 90 according to the frequency band in which the signals are transmitted from the earth station 8.

For the sake of clarity, a single antenna 90 and beam-forming device 92 are shown. However, since different carrier frequencies are used for the forward and return links, separate receiving and transmitting antennas 90 and beam-forming devices 92 will preferably be used.

Signalling Format

Figure 6:
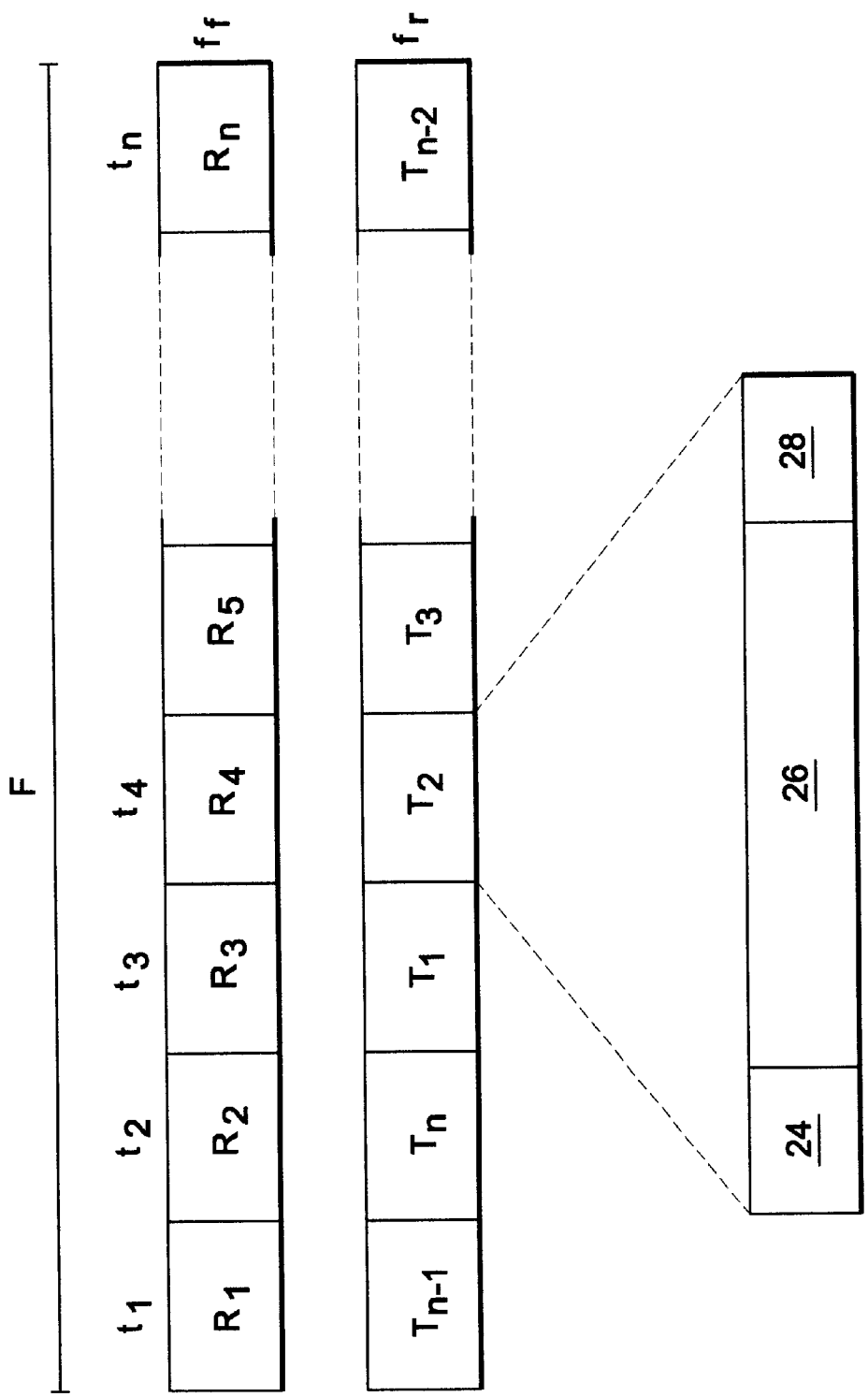
FIG. 6 is a diagram of the format of forward and return packets within a frame according to a first embodiment.

As shown in FIG. 6, the earth station 8 can communicate with a number of mobile terminals 18 at the same time by sending packets $R_1$ to $R_n$ sequentially in a repeating time frame F, the beginning of which is marked by a frame header signal. Each frame F is divided into a number of time slots $t_1$ to $t_n$ corresponding to different channels, each channel being assigned to one of the mobile terminals 18 by the earth station 8 when a call is set up.

For example, if the mobile terminal 18 has been assigned to the first channel, it will decode only the packet $R_1$ in the first slot $t_1$ in each frame F to generate a voice signal. The method of multiplexed communication is known as Time Divided Multiple Access, or TDMA.

A channel is assigned to each mobile terminal 18 during call setup by transmitting an instruction signal to the mobile terminal 18 from the earth station 8.

Each mobile terminal 18 is assigned a return channel having a predetermined time slot t, different from that of the forward channel, in the frame F, for transmission of a return packet $T_1$ to $T_n$. For example, the mobile terminal 18 to which the first slot $t_1$ is assigned for reception of the packet $R_1$ may be assigned the third slot $t_3$ for the transmission of a return packet $T_1$. Different frequencies $f_f$ and $f_r$ are used for the forward and return channels so that the mobile terminals 18 communicate in full duplex mode.

Alternatively, a half duplex mode could be used, in which the return packets T would be transmitted at the same frequency as the forward packets R, with the forward packets R alternating with the return packets T in the frame F.

Each forward and return packet consists of a header portion 24 containing control information, speech data 26 and a check portion 28 such as a CRC for correcting errors in the speech data 26.

In order to ensure that the correct signal is received by each mobile terminal 18, in the same time slot t in every frame F, the earth station 8 delays the timing of transmission from the buffers 85 to a particular satellite to compensate for the variations in propagation delay via another satellite, and for the change in delay in handing over from one satellite to another. In order to determine the correct timing, the controller 88 of the earth station 8 may include a store unit storing ephemerides of the positions of the different satellites so that their position and range may be calculated at any instant. In addition, the position of each mobile terminal 18 is determined. This may be achieved by comparing the delays in the signals 3a, 3b transmitted from the mobile terminal 18 by different satellites 4a, 4b. However, this method requires that the signals 3 are received from more than one satellite if an unambiguous measurement is to be achieved. Because of blockage, this may not be possible. Hence, additional position determining methods should be used.

As each satellite 4a, 4b generates an array of beams at different angles, the angular position of the mobile terminal 18 relative to a satellite is determined by identifying the beam in which the return signal 3 is detected. In addition, the Doppler shift of the signal 3 is measured to determine the angle of the mobile terminal 18 relative to the direction of motion of the satellite. The position of each mobile terminal 18 is calculated by some or all of the above techniques.

The earth station 8 may store the last known position of each mobile terminal 18, so that position calculation need only be carried out if the mobile terminal 18 is not found in its previous area.

Alternatively, each mobile terminal 18 may include Global Positioning System (GPS) hardware for determining the position of the mobile terminal 18, which information may be incorporated in signals transmitted to the earth station 8.

The timing of transmission of the return packets T is synchronized by the mobile terminal 18 with the timing of the reception of the forward packets R. Since the earth station 8 controls the timing at which the forward packets 12 are received, the timing of the mobile terminal 18 is controlled by the earth station 8. To allow some margin for timing error, the time slots are separated by short intervals, called "guard bands".

Furthermore, the controller 88 of the earth station 8 measures the Doppler shift of the signal 3 received from each mobile terminal and controls the modulation frequency of the RF modulators 86 to compensate for the Doppler shift, so that the signal 15a is always received by the mobile terminal 18 at the assigned frequency. By the above compensatory techniques, which are carried out at the earth station 8, the processing burden on the mobile terminals 18 is reduced so that their reliability may be increased, their construction may be substantially simplified and they may be manufactured at low cost.

More than one satellite may be selected for the forward link, the signal 15 from the earth station 8 being transmitted to each selected satellite with a timing calculated so that the signals 15a, 15b from the satellites 4a, 4b arrive simultaneously at the mobile terminal 18.

Beam Arrangement

Figure 7:
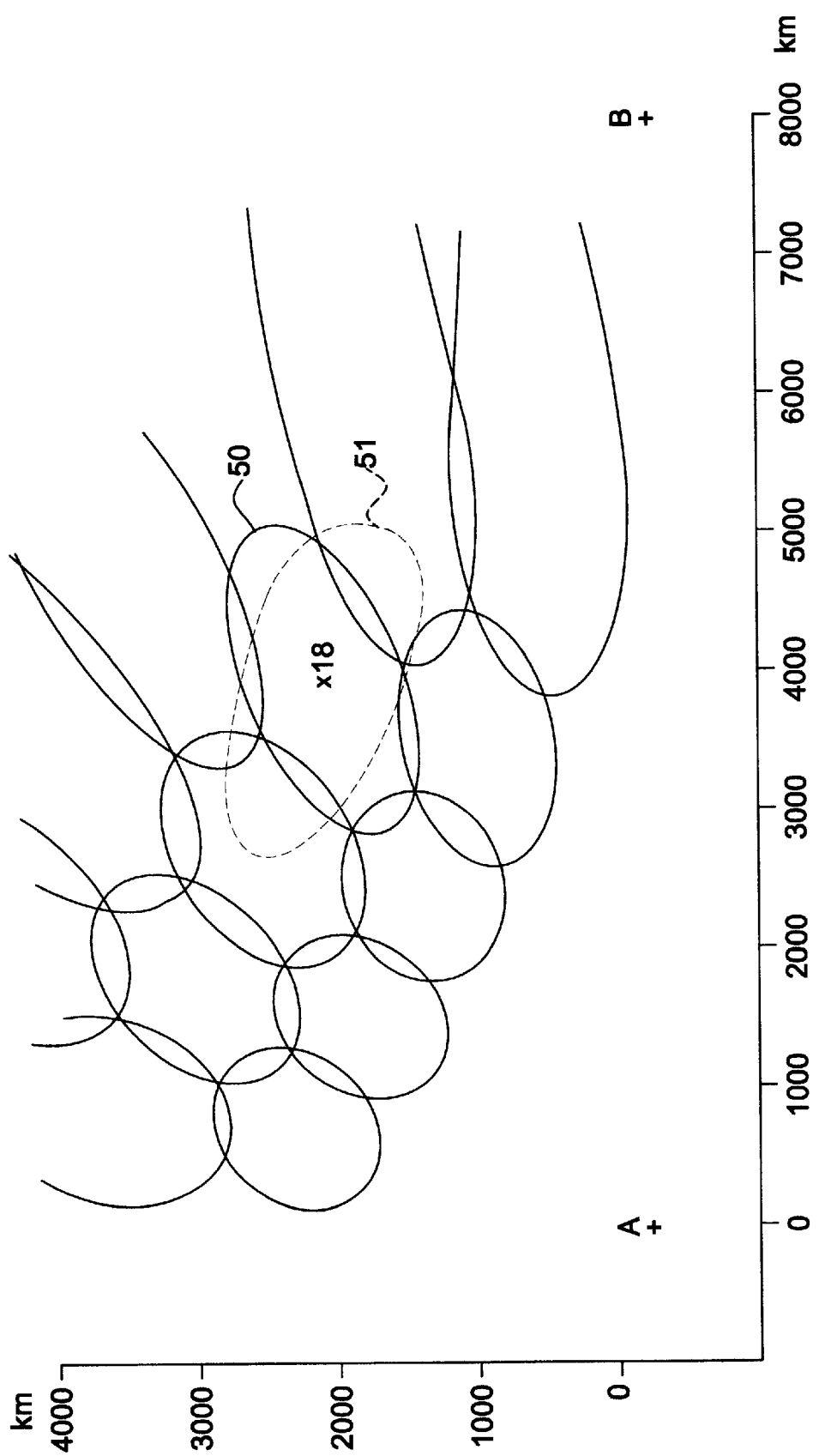
FIG. 7 shows the arrangement of spot beam footprints on the earth's surface.

Each satellite 4a, 4b has an array antenna 90, for communication with the mobile terminal 18, which synthesizes a number of overlapping spot beams each having a projected area 50 on the earth's surface of between 1000 km and 3000 km in diameter, as shown in FIG. 7. In FIG. 7, the nadir of the satellite 4a on the earth's surface is shown at point A and the nadir of the satellite 4b is shown at point B, with the great circle distance between these points being represented by the horizontal axis. The vertical axis represents distance along a great circle orthogonal to the great circle connecting the nadirs of the two satellites 4a, 4b. The mobile terminal 18 is located within the footprint 50 of one spot beam of the satellite 4a and within the footprint 51 of a spot beam of the satellite 4b, so that communication is possible via either satellite.

Each array antenna 90 may project 121 beams collectively covering substantially the entire field of view of the satellite 4a, 4b.

Fixed Regions

Figure 8:
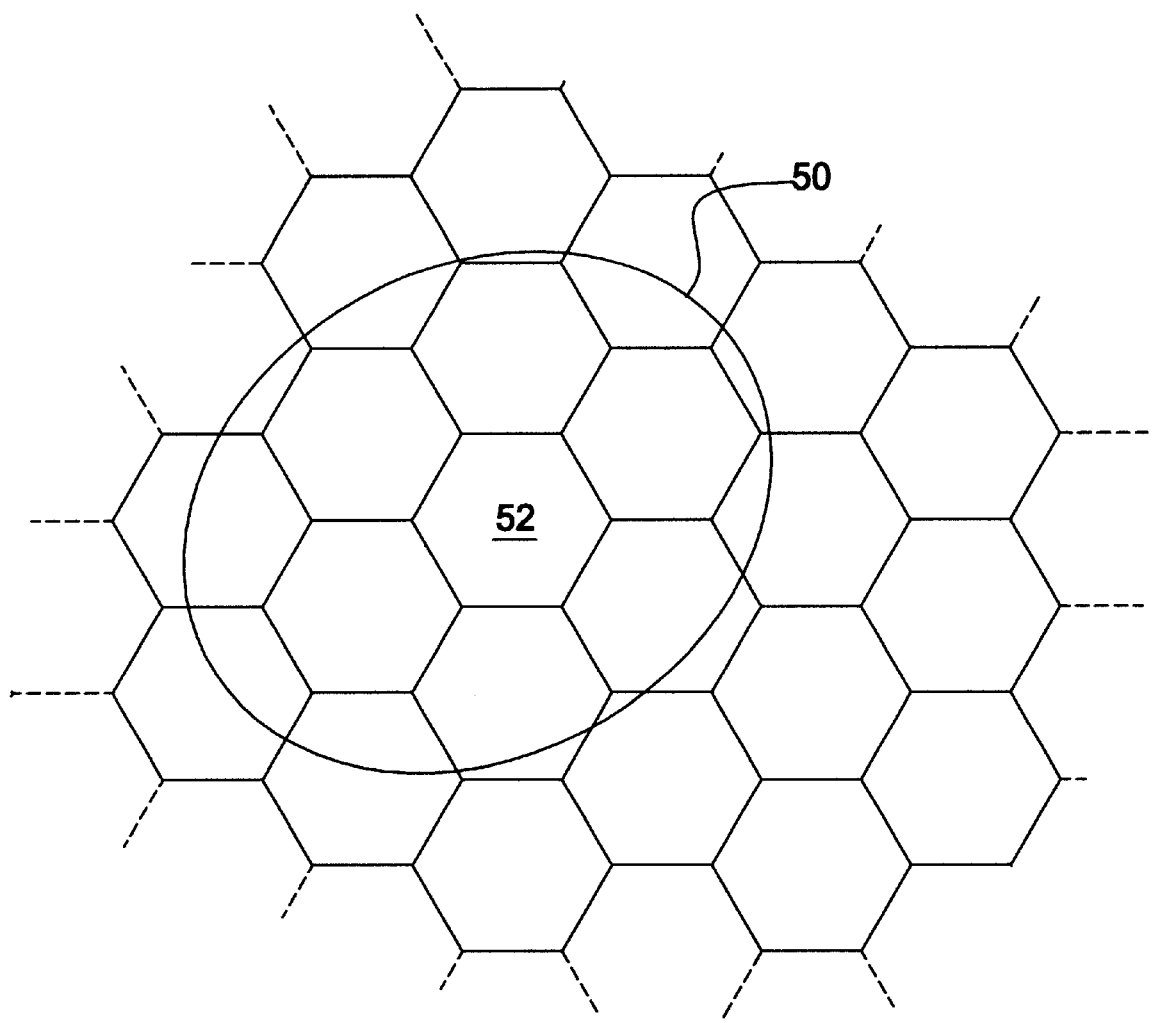
FIG. 8 shows the arrangement of cells on the earth's surface in the first embodiment.

As shown in FIG. 8, the area of the earth's surface is divided by the controller 88 into regions 52 and a sub-carrier transmission and reception frequency pair is assigned to each region 52. Thus, the transmit and receive frequency for each mobile terminal 18 are determined according to the region 52 in which it is located, the regions 52 being fixed relative to the earth's surface. A sample spot beam footprint 50 is shown overlapping a group of regions 52, which are hexagonal in this example.

When a call is set up, the position of the mobile terminal 18 is determined by the controller 88 of the earth station 8 according to the techniques described above and a control signal is transmitted to the mobile terminal 18 to assign a particular pair of frequencies. These frequencies remain unchanged throughout the call unless the mobile terminal 18 itself moves into another cell 52. Each cell 52 has a radius of approximately 200–300 km, so the mobile terminal 18 is unlikely to move frequently between cells 52 during a call. It should be noted that the size and position of each cell is defined with reference to the earth's surface and not to a satellite beam.

In another alternative, the assignment of frequencies to regions may change in a predetermined sequence (so-called "frequency hopping").

All of the mobile terminals 18 within the same cell 52 transmit and receive at the same pairs of frequencies $f_f$ and $f_r$, and the signals from the different mobile terminals 18 are separated using TDMA, as shown in FIG. 6. Since the different mobile terminals 18 are contained within the relatively small, fixed area of the cell and are all at approximately the same distance from any one satellite, the variation in the uplink propagation delay between different mobile terminals and any one satellite is limited. In this way, the problem of interference between signals in adjacent time slots is greatly reduced.

Handover

The assignment of regions 52 to spot beams is determined at the satellite 4 or at the earth station 8 so that handover of regions 52 between spot beam areas 50 is transparent to the mobile terminal 18.

Figure 9:
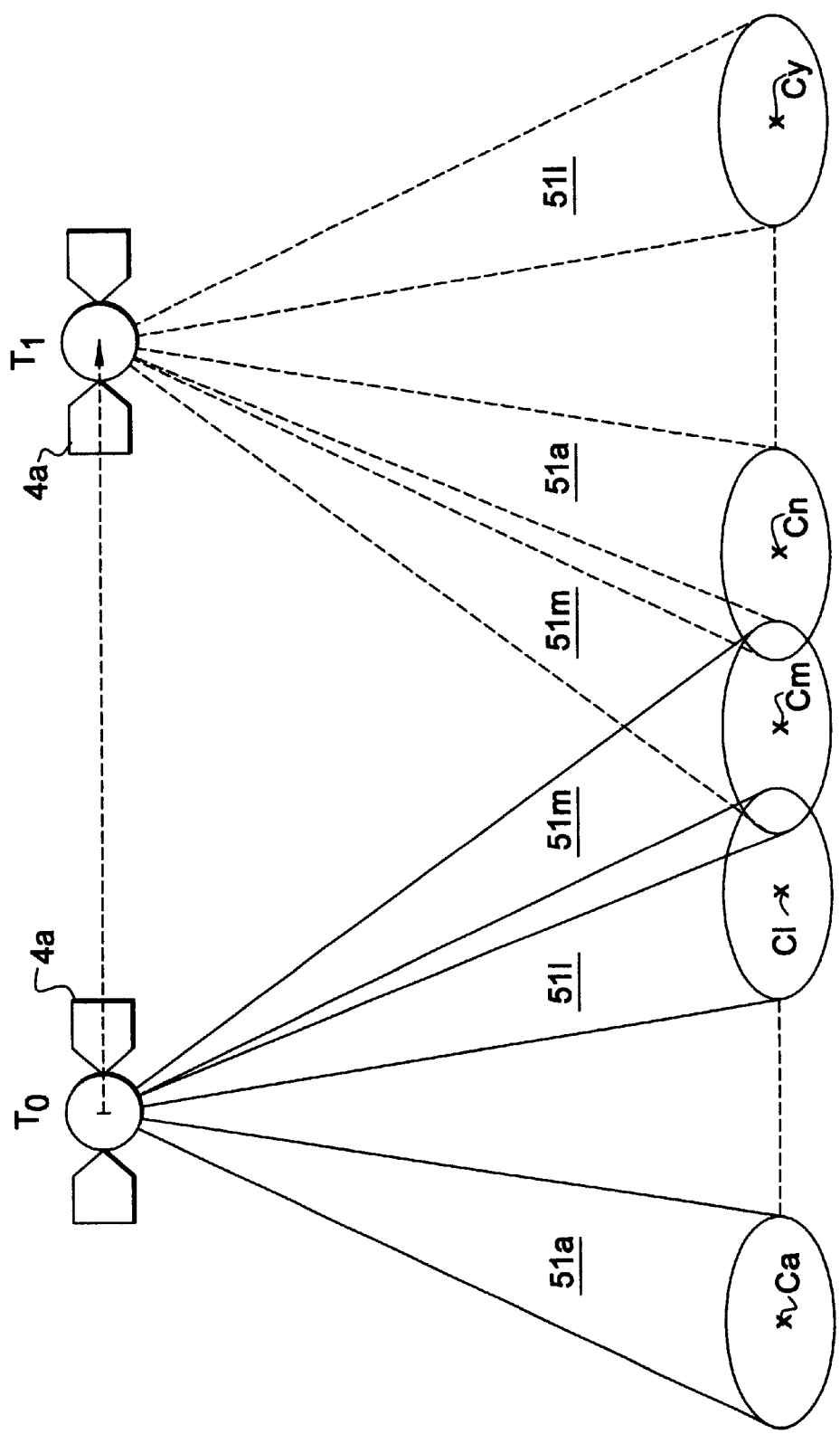
FIG. 9 shows how the beams of a satellite are directed in the first embodiment as the satellite progresses in its orbit.

FIG. 9 shows the allocation of a row of spot beams 51 in the beam pattern of a satellite 4a to groups of regions 52 at time $T_0$ and at a later time $T_1$. At time $T_0$, overlapping spot beams 51a to 51l are directed at centres Ca to Cl of groups of regions 52 on the surface of the earth. As the satellite progresses in its orbit, the spot beams 51 are individually steered so as to remain pointing at their respective centres C.

After $T_0$, the elevation angle of the satellite 4a with respect to the centre Ca becomes undesirably low for reliable communication. The earth station 8 detects the position of the centre Ca with respect to the satellite 4a and controls the satellite 4a by sending control signals to redeploy the beam 51a to a new centre Cn. By this time, another satellite 4b (not shown in FIG. 9) is already covering the regions 52 around the centre Ca with one of its spot beams, so that satellite-to-satellite handover is achieved without any interruption of the communication service. At time $T_1$, all of the spot beams 51 have been redeployed except for the beam 51m.

Thus, the coverage area of the antenna as a whole moves progressively forward, and the antenna boresight or focal direction remains pointing downwards directly below the satellite.

The coverage area of the spot beams 51 of the satellite 4a progresses in a fashion which may be likened to the progress of a caterpillar or tank track, with the spot beams corresponding to the elements of the track. Each spot beam 51 is individually and continually steered to remain fixed on a centre until it reaches the outermost rearward position of the beam pattern, when it is redeployed to the outermost forward position. However, the overall beam pattern projected by the antenna of the satellite 4a progresses on a continuous track over the earth's surface with the progression of the satellite. This method provides reduced frequency of beam-to-beam handover, although it does not reduce the frequency of satellite-to-satellite handover.

Preferably, the earth station 8 continuously determines the correct direction for each of the beams 51 and sends control signals to the satellite 4a to control the direction of the beams 51. However, the means for determining the beam directions may alternatively be incorporated in the satellite, or in a separate ground-based satellite control station.

Second Embodiment

A second embodiment will now be described with reference to FIGS. 1 to 5, 10 and 11. The second embodiment differs from the first embodiment in the operation of the earth station 8, mobile terminal 18 and satellites 4, and in that the mobile terminal 18 receives signals from different satellites 4 in different time slots.

Signalling Format

Figure 10:
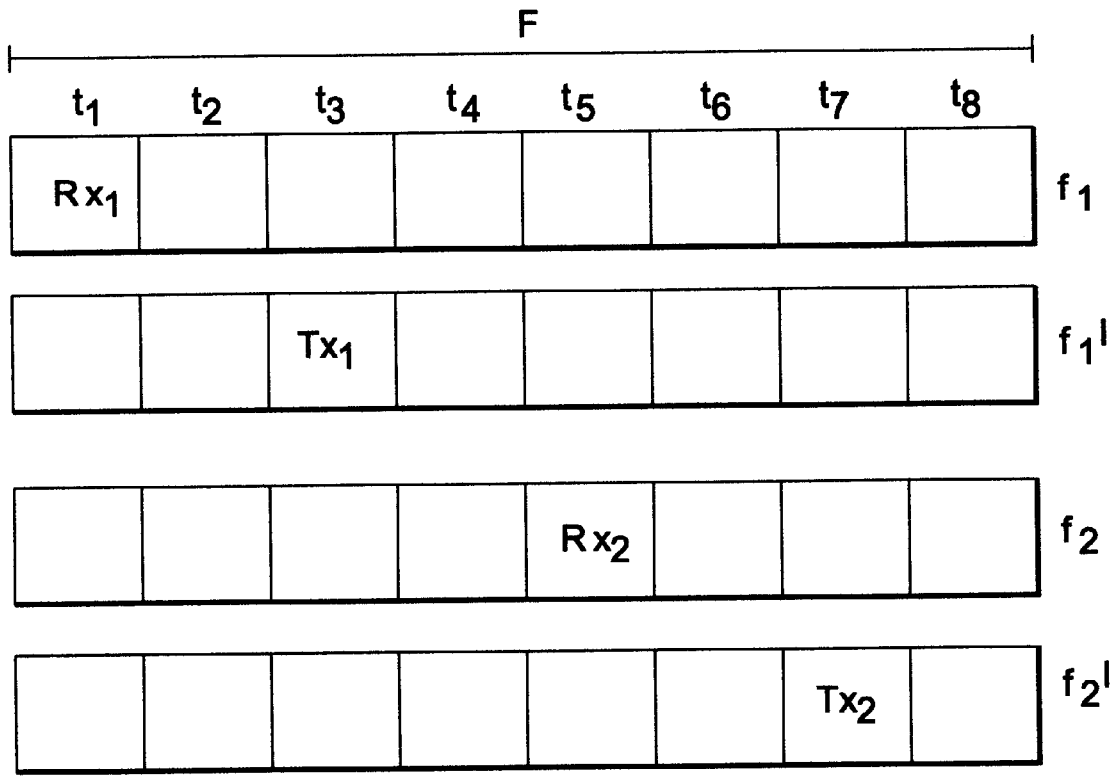
FIG. 10 is a diagram of the format of forward and return packets within a frame according to a second embodiment.

As shown in FIG. 10, the mobile terminal 18 communicates with the earth station 8 during allocated time slots t within a repeating time frame T, via the first and second satellites 4a, 4b, or via first and second beams of one satellite, at pairs of frequencies $f_1$, $f_1'$ and $f_2$, $f_2'$ respectively.

In the example shown, the earth station 8 transmits a packet $Rx_1$ in time slot $t_1$ via the first satellite 4a, which packet is received at frequency $f_1$ by the mobile terminal 18. The mobile terminal 18 then transmits a packet $Tx_1$ in time slot $t_3$ at the frequency $f_1'$ via a beam generated by the satellite 4a. The earth station 8 transmits a packet $Rx_2$, containing the same information as the packet $Rx_1$, via the second satellite 4b, or via a further beam generated by the satellite 4a, which retransmits the packet $Rx_2$ to the mobile terminal 18 at frequency $f_2$ in time slot $t_5$. The mobile terminal 18 then transmits a packet $Tx_2$, containing the same information as the packet $Tx_1$, in time slot $t_7$ at the frequency $f_2'$. The packet $Tx_2$ is retransmitted to the earth station 8 by the second satellite 4b. In this way, the controller 59 has sufficient time to retune the RF modulator 66 or demodulator 70 during the intervening time slots.

Alternatively, two RF demodulators and two RF modulators may be provided in the mobile terminal, tuned to the frequencies $f_1$ and $f_2$ and $f_1'$ and $f_2'$ respectively.

When the mobile terminal has received both the packets $Rx_1$ and $Rx_2$, the packet decoder 72 combines the two, or selects the better packet, for conversion to speech, as in the first embodiment. Similarly, the earth station 8 combines the two transmitted packets $Tx_1$ and $Tx_2$ or selects the better packet, to improve the quality of the signal transmitted to the PSTN 9.

In this example, each time frame T comprises eight time slots t, so that eight mobile terminals 18 can communicate with the earth station 8 at the frequencies $f_1$, $f_1'$, $f_2$ and $f_2'$ using TDMA. However, the allocation of time slots is flexible, to optimize the number of users and quality of communication, as described below.

During call set-up, the mobile terminal 18 monitors pilot signals transmitted by the satellites 4 to determine which satellites are in view and whether any satellite links are blocked. This information is transmitted to the earth station 8. If only one satellite is in view, the earth station 8 allocates only one time slot for transmission and one for reception at the pair of frequencies corresponding to that satellite. The mobile terminal 18 monitors the pilot signals during the calls so that, if another satellite comes into view, the mobile terminal 18 communicates this information to the earth station and further transmit and receive time slots are allocated at the pair of frequencies corresponding to the other satellite. Although in the above example two time slots are allocated for transmission by the mobile terminal 18, only one of the time slots may be used if the return link is satisfactory in order to conserve power and reduce electromagnetic emissions, which is particularly important for hand-held mobile terminals.

The controller 59 of the mobile terminal 18 monitors the quality of signal received from both satellites 4a and 4b and normally transmits only during the time slot and at the frequency corresponding to the satellite from which the stronger signal is received. However, if the selected return link provides only a weak signal, as in the case of multipath fading, the earth station 8 communicates this information to the mobile terminal 18 and the alternative return link is selected.

Furthermore, if a greater number of users is to be accommodated at any time, only one time slot for each of transmission and reception may be allocated to each mobile terminal 18.

Figure 11:
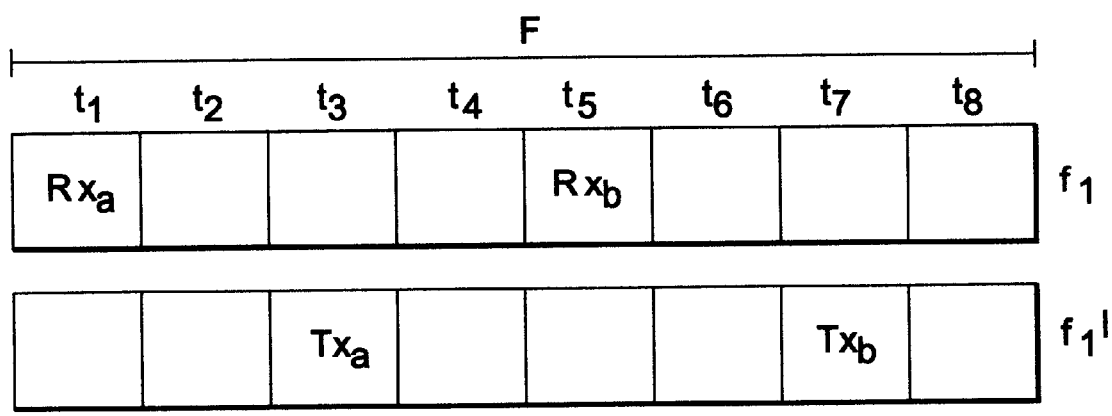
FIG. 11 is a diagram of an alternative format to that shown in FIG. 10.

If none of the satellites provides a link of satisfactory quality, a lower baud rate is selected by the earth station 8 and the voice data is divided into two different packets in each time frame. As shown in FIG. 11, the frequencies $f_1$, $f_1'$ are used for communication via only the first satellite 4a. The voice data encoded in a single packet $Rx_1$ or $Rx_2$ in the embodiment shown in FIG. 10 is divided between two packets $Rx_a$ and $RX_b$ which are transmitted at the frequency $f_1'$ by the earth station 8 at half the normal baud rate in time slots $t_3$ and $t_5$ respectively. Likewise, the voice data transmitted by the mobile terminal 18 is divided between two packets $Tx_a$ and $Tx_b$ in each time frame T and transmitted in time slots $t_2$ and $t_6$ at half the normal baud rate. The reduction of baud rate reduces the probability of bit errors. Alternatively, two satellite beams may be used for transmission and reception, and the packets $Rx_a$, $Rxb$ and $Tx_a$, $Txb$ may be divided between the two beams.

The above technique of selecting a lower baud rate and dividing the transmitted signal into two or more packets may also be employed in the first embodiment.

Handover

In the second embodiment, the satellite beams are not steered but sweep across the earth's surface at a constant rate as the satellite 4 progresses in its orbit. As in FIG. 7, the beams overlap so that the mobile terminal 18 is able to communicate via more than one beam at least some of the time. Furthermore, beams from different satellites 4a, 4b may overlap so that the mobile terminal 18 is able to communicate via more than one satellite 4a, 4b. Transmission or reception frequencies are allocated according to the spot beam in which the mobile terminal 18 falls and not according to the position of the mobile terminal 18 on the earth's surface. As the beams of each satellite 4 sweep over the earth's surface, the mobile terminal 18 will pass from one beam to the next and a call will therefore need to be handed over from beam to beam to reach the mobile terminal 18. This is achieved by determining at the earth station 8 which beam the mobile terminal 18 falls within and allocating a call with the mobile terminal 18 in the appropriate beam. When the mobile terminal 18 is handed over to a new beam, a command signal is sent to the mobile terminal 18 including information on the time slots t and the transmit and receive frequencies to be used by the mobile terminal in the new beam, and the mobile terminal thereafter uses the new frequencies and time slots indicated in the command signal for communication via that satellite 4.

The earth station 8 may use any of a number of well-known techniques to determine to which new beam the mobile terminal is to be handed over and when handover is to take place. For example, since the positions of the satellites 4 and of the mobile terminal 18 are known, the passage of the mobile terminal through the beams projected by any of the satellites 4 is entirely predictable and this information may obviously therefore be used to determine when handover is to take place, and to which beam.

Alternatively, the strength or quality of signals received from the mobile terminal 18 through the current beam may be monitored and handover performed when the signal through the current beam is unacceptable. Diversity may be provided through two beams of the same satellite, providing a soft beam-to-beam handover.

The timing of forward link transmissions is controlled by the earth station 8 and the return link transmissions are synchronized with the reception of forward link signals, as in the first embodiment. However, in the second embodiment the mobile terminals 18 adjust the frequency of transmission on the return link to compensate for Doppler shift detected in the received signals, as well as the earth station 8 compensating for Doppler shift on the forward link.

Since the mobile terminals 18 using the same transmission frequency are no longer confined to a fixed region, the guardbands between time slots at the mobile terminal transmission frequencies are larger in the second embodiment than in the first embodiment, to avoid interference between adjacent time slots on the return link.

Although the above embodiments have been described with reference to a mobile or portable (e.g. hand-held) terminal, transportable or even fixed terminals may be used in the same communications system.

The system is not restricted to any particular constellation of satellites, but may advantageously be applied to satellites in low earth orbits of less than 2000 km altitude or medium earth orbits of between 10,000 and 20,000 km altitude.

Preferably, a subsynchronous orbit of approximately 6 hours' period may be used, corresponding to an altitude of 10355 km.

In both embodiments, the number of time-slots in each time frame may be chosen according to the likely density of users. Although different frequencies are used by the mobile terminals for transmission and reception in the preferred embodiments, a single frequency may be used, with alternate time slots assigned for transmission and reception.

The embodiments are described above for illustrative purposes only and the present invention is not limited in scope thereto.

What is claimed is:

1. A method of satellite communication between a first earth station and a second earth station comprising:
   receiving at the second earth station information transmitted from the first earth station within one or more time-division multiplexed time slots and relayed via a plurality of beams generated by one or more satellites;
   said method being characterized by the steps of:
      selecting one or more of said satellite beams according to a property of the information received via said satellite beams; and
      transmitting further information from said second earth station to the first earth station such that the further information is relayed via said selected one or more satellite beams.

2. A method as claimed in claim 1, further comprising:
   calculating variations in the delay in the transmission link between the first earth station and the second earth via said selected one or more satellite beams, and transmitting the further information from the second earth station to the one or more satellites which generates the or each selected satellite beam with a timing determined so as to compensate for said variations.

3. A method as claimed in claim 2, wherein the further information is transmitted from the second earth station to the first earth station via two or more said selected beams, and the timings of the transmissions are determined so that the information is received substantially simultaneously at the first earth station via the selected beams.

4. A method as claimed in any preceding claim, further comprising measuring the Doppler shift from a predetermined frequency of the frequency of a signal containing the information received at the second earth station, and selecting the frequency of a signal containing the further information so as to compensate for the measured Doppler shift.

5. A method as claimed in any preceding claim, further comprising determining the position of the first earth station; wherein the further information is transmitted from the second earth station with a frequency determined according to the derived position of the first earth station.

6. A method as claimed in claim 5, further comprising transmitting to the first earth station a control signal for controlling the transmission and reception frequencies of the first earth station, the control signal being generated according to the derived position of the first earth station.

7. A method as claimed in claim 1 or 2, wherein the second earth station receives the information more than once in different time slots via a corresponding number of said satellite beams.

8. A method as claimed in claim 7, wherein the second earth station receives the information transmitted by the first earth station within a first time slot in a first frequency channel ($f_1'$) of a second satellite beam, and
   receives the information which is transmitted again by the first earth station during a second time slot in a second frequency channel of a second satellite beam.

9. A method as claimed in claim 8, further comprising:
   comparing respective properties of the received information transmitted by
   the first earth station during the first and second time slots and transmitting the further information at a selected frequency corresponding to one of the first and second satellite beams according to the result of the comparison.

10. A method as claimed by any preceding claim, wherein if a property of the received information fails to satisfy a predetermined criterion, the second earth station transmits the further information at a lower rate, and if the property of the received information satisfies said predetermined criterion, the second earth station transmits the further information at a higher rate.

11. A method as claimed in claim 10, wherein the information is transmitted by the steps of:
   dividing the further information into first and second portions;
   transmitting the first portion to the first earth station within a third time slot; and
   transmitting the second portion to the first earth station within a fourth time slot.

12. A method as claimed in any preceding claim, wherein said property relates to the quality of previous information previously received by the first earth station from the second earth station.

13. A method as claimed in any one of claims 1 to 11, wherein the property relates to the quality of said information received by the second earth station.

14. A method of satellite communication using TDMA channels, comprising:
   transmitting the same information from a first earth station within each of a plurality of time slots to a second earth station, at respective, different frequencies so that the information is received in respective, different beams generated by one or more satellites.

15. Apparatus for use in a satellite communications earth station using TDMA channels, comprising:
   a receiver arranged to receive information relayed by one or more satellites from a remote earth station within one or more time slots, the information being relayed via a plurality of beams generated by said one or more satellites;
   beam selecting means for selecting one or more of said satellite beams according to a property of the information received therein, and a transmitter arranged to transmit further information to the remote earth station such that the information is relayed to the remote earth station via the selected one or more satellite beams.

16. Apparatus as claimed in claim 15, further comprising:
   means for calculating variations in the transmission delay to the remote earth station via the selected one or more satellite beams, and control means for controlling the timing of the transmitter to compensate for the variations.

17. Apparatus as claimed in claim 16, wherein the beam selecting means is arranged to select two or more of said satellite beams, and the control means is arranged to control the timing of the transmitter so that the transmitted information is received substantially simultaneously at the remote earth station via each of the selected beams.

18. Apparatus as claimed in any one of claims 15 to 17, further comprising means for measuring the Doppler shift in a received signal containing the information, and means for adjusting the frequency of the transmitter to compensate for the measured Doppler shift.

19. Apparatus as claimed in any one of claims 15 to 18, further comprising means for deriving the position of the remote earth station; and frequency selecting means for selecting the frequency of the transmitter according to the derived position of the remote earth station.

20. Apparatus as claimed in claim 19, including means for generating a control signal for controlling the transmission and reception frequency of the remote earth station according to the derived position thereof the transmitter being arranged to transmit the control signal to the remote earth station.

21. Apparatus as claimed in claim 15 or 16, wherein the receiver is arranged to receive the information more than once sequentially via a corresponding number of said beams.

22. Apparatus as claimed in claim 21, wherein the receiver is arranged to receive the information transmitted by the remote earth station within a first time slot in a first frequency channel of a first satellite beam and to receive the information which is repeated by the remote earth station during a second time slot ($t_7$) in a second frequency channel of a second satellite beam.

23. Apparatus as claimed in claim 21 or 22, further comprising:
   comparing means for comparing a property of the information transmitted by the remote earth station during the first and second time slots; wherein
   the transmitter is arranged to transmit a signal in a frequency channel corresponding to one of the first and second beams selected by the comparing means.

24. Apparatus as claimed in any one of claims 15 to 23, wherein the transmitter is arranged to transmit at a lower rate if the received information fails to satisfy a predetermined criterion and to transmit at higher rate if the predetermined criterion is satisfied.

25. Apparatus as claimed in claim 24, wherein the transmitter is arranged to divide the information to be transmitted into first and second portions, to transmit the first portion to the remote earth station within a third time slot and to transmit a second portion to the remote earth station within a fourth time slot.

26. Apparatus as claimed in any one of the claims 15 to 25, wherein said property relates to the quality of previous information previously received by the remote earth station from the satellite communications earth station.

27. Apparatus as claimed in any one of claims 15 to 25, wherein the property relates to the quality of the received information.

28. A user station for satellite communications, comprising a transmitter arranged to transmit the same information within each of a plurality of time slots to a base station at respective different frequencies so as to be receivable in respective different beams generated by one or more satellites.

* * * * *

UNITED STATES PATENT AND TRADEMARK OFFICE
CERTIFICATE OF CORRECTION

PATENT NO. : 6,314,269 B1
DATED : November 6, 2001
INVENTOR(S) : Nicholas Hart et al.

It is certified that error appears in the above-identified patent and that said Letters Patent is hereby corrected as shown below:

<u>Title page,</u>
Item [73], Assignee, should be -- Inmarsat, Ltd. (GB) --.

Signed and Sealed this

Sixth Day of September, 2005

JON W. DUDAS
*Director of the United States Patent and Trademark Office*